(12) United States Patent
Grenier

(10) Patent No.: US 10,354,277 B2
(45) Date of Patent: Jul. 16, 2019

(54) METHODS AND SYSTEMS FOR SEARCHING AND DISPLAYING PROMOTIONAL OFFERS ON A MOBILE DEVICE BASED ON CURRENT USER LOCATION

(71) Applicant: Pinny Inc., Lone Tree, CO (US)

(72) Inventor: Eric Grenier, Parker, CO (US)

(73) Assignee: Pinny Inc., Lone Tree, CO (US)

( * ) Notice: Subject to any disclaimer, the term of this patent is extended or adjusted under 35 U.S.C. 154(b) by 678 days.

(21) Appl. No.: 14/496,494

(22) Filed: Sep. 25, 2014

(65) Prior Publication Data
US 2016/0092923 A1 Mar. 31, 2016

(51) Int. Cl.
G06Q 30/00 (2012.01)
G06Q 30/02 (2012.01)
G06F 16/9537 (2019.01)

(52) U.S. Cl.
CPC ..... *G06Q 30/0261* (2013.01); *G06F 16/9537* (2019.01); *G06Q 30/0236* (2013.01)

(58) Field of Classification Search
CPC ............ G06Q 30/0236; G06Q 30/0261; G06F 17/3087
USPC ...................................................... 705/14.58
See application file for complete search history.

(56) References Cited

U.S. PATENT DOCUMENTS

| 9,429,435 B2 * | 8/2016 | Blumenberg | |
| 2008/0140520 A1 * | 6/2008 | Hyder | G06Q 20/342 705/14.1 |
| 2013/0006737 A1 * | 1/2013 | Goldberg | G06Q 30/02 705/14.12 |
| 2014/0188616 A1 * | 7/2014 | Badenhop | G06Q 30/0267 705/14.58 |
| 2014/0244734 A1 * | 8/2014 | Nutt | G06Q 10/107 709/203 |
| 2014/0297617 A1 * | 10/2014 | Rajakarunanayake | G06F 17/30241 707/709 |

OTHER PUBLICATIONS

Advanced Artificial Intelligence, Shi, World Scientific, 2011, pp. 430-458.*
Data Mining, Elsevier, Han and Kamber, 2006, pp. 234-274.*
Streetlights and Shadows, MIT Press, 2009, pp. 33-47.*

* cited by examiner

Primary Examiner — Matthew T Sittner
Assistant Examiner — Michael I Ezewoko
(74) Attorney, Agent, or Firm — Georgiy L. Khayet

(57) ABSTRACT

Methods and systems for searching and displaying promotional offers on a display screen of a mobile device based on current user location have been disclosed. An example method comprises identifying a location of the mobile device, retrieving from a remote server one or more promotional offers provided by merchants located in the nearby area within a predetermined distance from the identified location, associating the location of the mobile device and locations of the one or more merchants providing the one or more promotional offers with a virtual map, generating one or more map elements associated with locations of the mobile device and the one or more merchants, and displaying the virtual map and the one or more map elements.

19 Claims, 10 Drawing Sheets

METHODS AND SYSTEMS FOR SEARCHING AND DISPLAYING PROMOTIONAL OFFERS ON A MOBILE DEVICE BASED ON CURRENT USER LOCATION

TECHNICAL FIELD

This disclosure relates generally to methods and systems for searching and displaying incentive promotional offers, and more particularly to methods and systems for searching and displaying promotional offers on a mobile device based on current user location, user settings, past history, and user demographics.

BACKGROUND

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

Today numerous loyalty programs are used to encourage and incentivize customers to make more purchasing decisions. One of the ways to engage customers is to provide different discounts and free products or services by way of issuing coupons.

The coupons are paper tickets or electronic documents that can be redeemed for a financial discount or rebate when a product or service is purchased. Traditionally, the coupons are issued by manufacturers or by retailers to be used in retail stores as part of sales promotions. They are widely distributed through mail, magazines, newspapers, the Internet, and mobile devices such as cellular phones. In general, a customer can redeem a coupon by showing the coupon to a cashier at the time of purchase.

Delivery of printed paper coupons may be expensive for the marketer. In recent years, paperless coupons have been used by marketers or retailers. Such paperless coupons can be delivered via the Internet, e-mails, mobile messages like SMS, MMS, or the like. The coupons can be redeemed at merchants without the necessity of printing, as they can be shown to a cashier directly via a mobile device, smart phone, a tablet computer, and so forth.

However, the ubiquity of coupons has led to a decrease in their impact. Many customers do not wish to be on e-mail lists to receive advertising coupons on a regular basis. On the other hand, while travelling, consumers may wish to know whether any of the merchants located in the nearby area offer any promotional coupons. For example, when consumers travel to a new city or district, they may wish to know what promotional offers are available at the time within the nearby area for a lunch or dinner. Searching for this information on the Internet may be lengthy and inconvenient.

Moreover, even when customers are in possession of coupons in paper or electronic format, they may not have a specific coupon at hand upon visiting a certain store, restaurant, hotel, car rental office, and so forth. As a result, many customers do not actively use the coupons they possess.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with various embodiments and the corresponding disclosure thereof, a computer-implemented method for searching and displaying promotional offers on a display screen of a mobile device is provided. The method comprises identifying a location of the mobile device. The method further comprises retrieving from a remote server one or more promotional offers provided by merchants located in the nearby area within a predetermined distance from the identified location. The method further comprises associating the location of the mobile device and locations of the one or more merchants providing the one or more promotional offers with a map. The method further comprises generating one or more map elements associated with locations of the mobile device and the one or more merchants. The method further comprises displaying the map and the one or more map elements.

The map element may comprise one or more of an icon associated with the location on the map and a content balloon associated with the icon to display descriptive information.

The method may further comprise detecting movement of the mobile device to a new location, which is a predetermined distance from the last identified or stored location, and prompting the user of the mobile device to associate the new location with the map by dropping a virtual pin. The method may further comprise communicating the information regarding the new location of the mobile device to the remote server. The method may further comprise enabling the user of the mobile device to drop a virtual pin on the map to designate one or more locations of interest visited by the user and associate the one or more locations of interest with the map.

The method may further comprise generating one or more map elements corresponding to the one or more locations of interest and displaying the map and the one or more map elements corresponding to the one or more locations of interest.

The method may further comprise enabling the user of the mobile device to manually configure settings. The settings may comprise one or more of: a distance between current location and last identified or stored location of the mobile device to make a notification for the user, the size of the nearby area to provide the user with promotional offers of merchants located in the nearby area, types of promotional offers to receive such as food, retail, health, beauty, entertainment, services, time of day to notify the user, and other user demographics such as age, gender, family makeup, and so forth.

The method may further comprise retrieving the map and/or map elements from the remote server. The retrieving from the remote server one or more promotional offers provided by merchants may comprise: generating and communicating to the remote server a user request to obtain the one or more available promotional offers (the user request may comprise the identified location of the mobile device) and receiving one or more promotional offers provided by merchants located within the nearby area within a predetermined distance from the identified location.

The promotional offer may comprise one or more of: offer information, a merchant picture, a merchant logo, merchant name, merchant address, merchant contact information, a distance between the user and the merchant, rating, customer reviews, offer expiration time, a price range, a coupon code, a bar code or other redemption mechanism. The offer information may comprise one or more of: a free product, a free service, a financial discount, reward points, or a rebate amount.

The method may further comprise generating one or more virtual incentive badges over predetermined locations that are associated with the map.

In accordance with other embodiments and the corresponding disclosure thereof, a system and a computer-readable medium, having instructions stored thereon, for performing steps of the above method are also provided.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
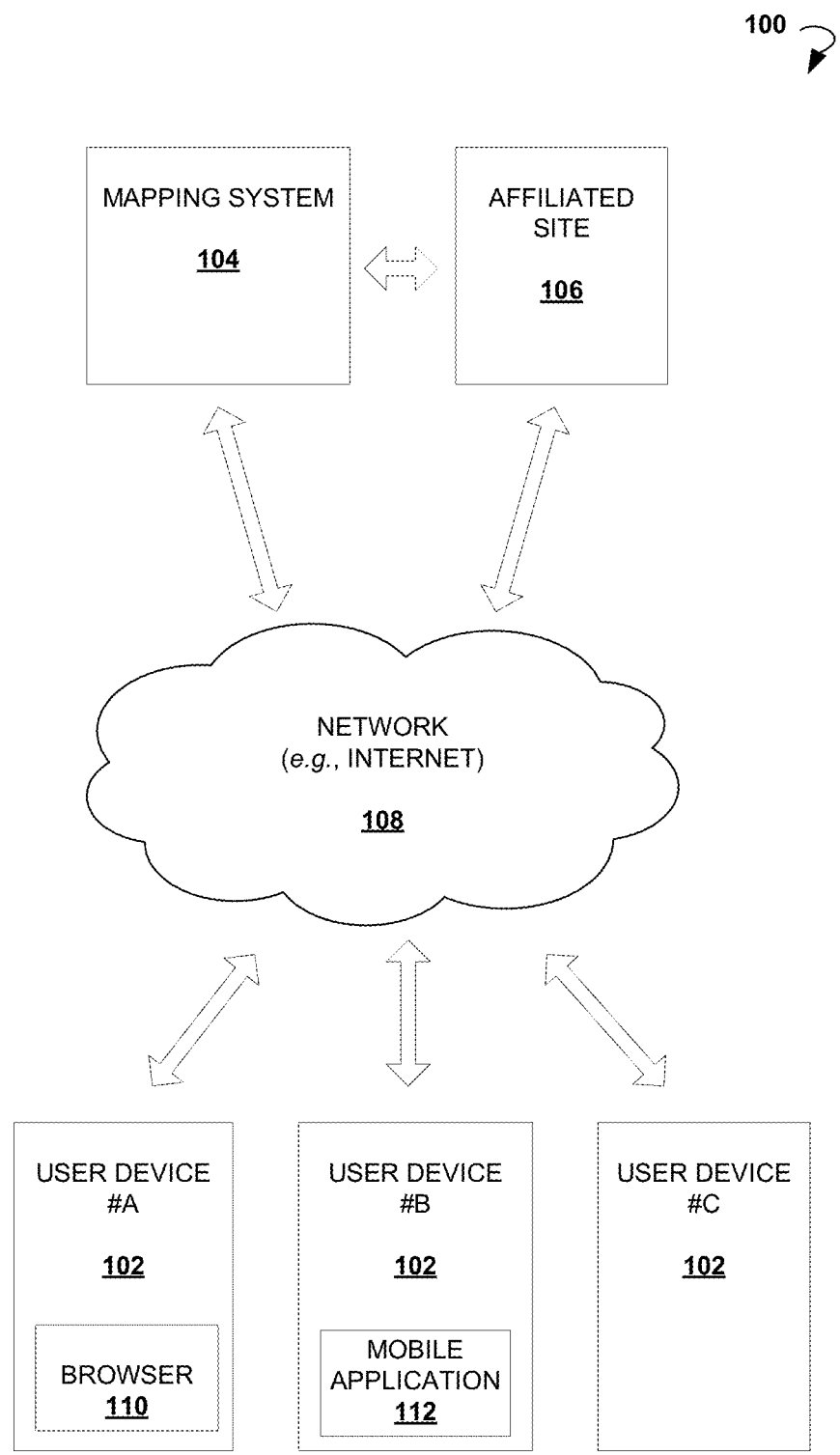
FIG. 1 shows a block diagram illustrating a system environment suitable for searching and displaying promotional offers on a display screen of a mobile device based on current location, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The embodiments described herein can be implemented by various means, depending on application. For example, the embodiments can be implemented in hardware, firmware, software, or a combination thereof. For hardware implementation, the embodiments can be implemented with processors, controllers, micro-controllers, microprocessors, electronic devices, other electronic units designed to perform the functions described herein, or a combination thereof. Memory can be implemented within a processor or external to the processor. As used herein, the term "memory" refers to any type of long term, short term, volatile, non-volatile, or other storage device and is not to be limited to any particular type of memory or number of memories, or type of media upon which memory is stored. For firmware and/or software implementation, the embodiments can be implemented with modules such as procedures, functions, and so on that performs the functions described herein. Any machine-readable medium tangibly embodying instructions can be used in implementing the embodiments described herein.

In accordance with various embodiments and the corresponding disclosure thereof, methods and systems for searching and displaying promotional offers on mobile devices based on current location of a user are provided. The methods and systems allow users of mobile devices such as cell phones, smart phones, tablet computers, PDAs, and the like to find multiple promotional offers provided by merchants located in the nearby area. In practice, the mobile device embeds an application which may determine location of the mobile device by requesting and processing GPS signals, information obtained from base stations when the mobile device works in the wireless network, or used IP addresses. Once the location of the mobile device is determined, the location can be associated with a virtual map and displayed on the mobile device display. The location can be marked on the virtual map as a map element (a "pin"). Upon initiation by the user to check what promotional offers are available in the nearby area (or when initiated by predetermined settings of the application), the application may transmit a user request to a remote server over a wireless network. The user request may comprise the identified location of the mobile device and additional information such as user credentials and settings. The remote server, in turn, addresses its database to reveal available promotional offers, and transmits them to the mobile device. When received, the mobile device associates the locations of the merchants providing the revealed promotional offers to the map, and generates one or more map elements to denote locations of such merchants. In result, the user may view on the mobile device the map having several map elements indicating a current location of the user and the locations of merchants.

Each map element may have different colors and/or designs. The map elements intended to illustrate locations of the merchants providing promotional offers can be equipped with content balloons to provide any text, image, or video content to the user.

To increase usage of the mobile application, the users may be provided with virtual incentive badges based on at least one or more of the locations they visit, types of promotions redeemed, total value of promotions redeemed and number of promotions redeemed.

According to some embodiments, the current location of the mobile device is determined on a regular basis. If the mobile device is moved to a new location of a distance more than a predetermined distance (e.g., more than 50 miles), the user may be prompted to associate the current location with the map by generating a new map element by dropping a virtual "pin". If the user performs such association, the information on the new location can be sent to the remote server for retrieving and generating new offers.

According to yet other embodiments, the user is enabled to modify settings. The settings, in turn, may comprise one or more of: a distance between the current location and the last identified or stored location of the mobile device to make a notification for the user, the size of the nearby area to provide the user with promotional offers of merchants located in the nearby area, days of a week (for example, weekdays only, weekends only, Wednesdays and Thursdays only, and so forth) and periods of time during a day to notify the user (for example, breakfast 6:00 am, lunch 12:00 noon, dinner 5:30 pm, and so forth).

The term "promotional offer," as used herein, refers to a financial discount, a rebate, a reward, a coupon or other promotional feature provided to a customer/user by a merchant.

The term "customer," as used herein, is intended to refer to a buyer or a consumer and defines any individual that makes purchases.

The term "merchant" is used herein to refer to a seller, a retailer, a distributor, a trader, and the like. It should be understood that merchants trade commodities (products or services) to customers at stores, shops, malls, restaurants, bistros, hotels, rental offices, transport companies, and so forth.

Referring now to the drawings, FIG. 1 shows a block diagram illustrating a system environment 100 suitable for searching and displaying promotional offers on a display screen of a mobile device based on current location, according to an example embodiment. The system environment 100 comprises one or more mobile devices 102, a mapping system 104, one or more affiliated sites 106, and a network 108.

The network 108 may couple one or more of the aforementioned modules. The network 108 is a network of data processing nodes interconnected for the purpose of data communication, which may be utilized to communicatively couple various components of the environment 100. The network 108 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port, such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 108 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The mobile device 102 may refer to a computer, a laptop, a tablet computer, a portable computing device, a PDA, a handheld cellular phone, a mobile phone, a smart phone, a wireless telephone, a handheld device having wireless connection capability, or any other electronic device with the ability to receive and transmit data via a wire or wireless network 108 (e.g., with the ability to browse the Internet).

According to some embodiments, the mobile device 102 may comprise a navigation system such as a GPS receiver and corresponding software allowing a user of the mobile device to determine a current location of the mobile device, display maps, navigate, find a certain address, get directions and routes, and so forth. The mobile device 102 may also be configured to determine its geographical location based on IP addresses and/or base station information.

The mobile device 102 can be used to communicate with the mapping system 104 and to establish and manage a profile of the user associated with the mobile device 102. To accomplish this means, the user may utilize a browser 110 of the mobile device 102, and the mapping system 104 may include a user interface accessible via the browser 110. The browser 110 may provide the ability to browse and interact with sites on the Internet, including the site deployed within the mapping system 102 or any other site (e.g., the affiliated site 106).

In some other embodiments, the mobile device 102 may comprise software to communicate with the mapping system 104. In one example, the software is a mobile application 112 embedded in the mobile device 102. The mobile application 112 may embed multiple modules and databases.

The mobile device 102 is designed to be utilized by the user to, among other things, identify its current location, associate its location on a virtual map displayable on the mobile device 102, and search and display promotional offers available in the nearby area within a predetermined distance from the current location. The mobile device 102 is further described in more detail below with reference to FIG. 2.

The mapping system 104, according to various embodiments disclosed herein, may be configured to provide functionality related to searching and delivering information on promotional offers available in certain geographical areas, storing and processing user data, and so forth.

The mapping system 104 can be implemented as a remote server having multiple embedded modules and databases. In addition, the mapping system 104 may provide access to the one or more affiliated sites 106.

According to various embodiments, the mapping system 104 may provide a gateway to the mobile device 102 to enable the mapping system 104 to communicate with the mobile device 102 via a secure protocol.

The mapping system 104 is described in more detail below with reference to FIG. 3.

According to various embodiments disclosed herein, the one or more affiliated sites 106 may include any site on the Internet. In some examples, the one or more affiliated sites 106 have a gateway to the mapping system 104 to enable visitors of these sites to access the database or use other functionality. In yet other examples, the one or more affiliated sites 106 refer to social networking sites, blogging sites, chatting sites, or any other social media sites. The implementation of such social media sites can provide mechanisms for their members to communicate with each other, form connections with each other, store information, and share information of interest, among other things. In use, members may join social media networks and then add connections to a number of other members to whom they desire to be connected. Traditionally, such connected members are also known as "friends." Social networking websites and blogging websites maintain member profiles for each member. According to various embodiments, the mobile devices 102 may interact with the affiliated sites 106 by communicating transmissions via the network 108.

Figure 2:
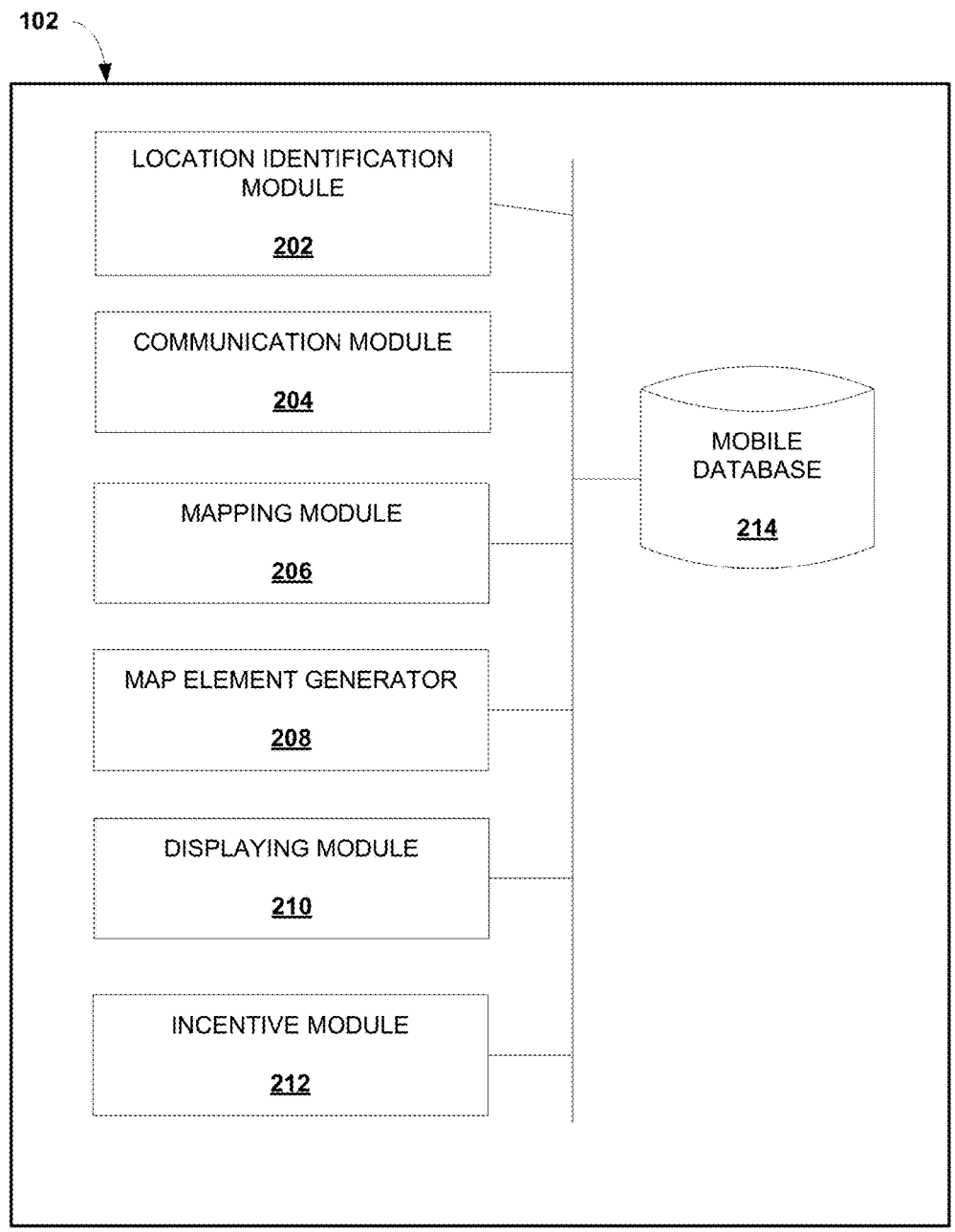
FIG. 2 is a representation of a mobile device, according to an example embodiment.

FIG. 2 is a representation of the mobile device 102, according to an example embodiment. In this embodiment, the mobile device 102 may include a location identification module 202, a communication module 204, a mapping module 206, a map element generator 208, a displaying module 210, an incentive module 212, and a mobile database 214. In other embodiments, the mobile device 102 may include additional, fewer, or different modules for various applications. Said modules can be implemented as hardware and/or software.

The location identification module 202 can be configured to identify a current location of the mobile device 102. The location can be identified by receiving and processing GPS signals, base station information (if used in a cellular network), or IP address(es) assigned to the mobile device 102. In some embodiments, for example, when the location identification module 202 is not able to operate, the user may input current location using the input means of the mobile device 102. Those who are skilled in the art would readily understand that multiple options for location determination are applicable.

The location identification module 202 can be further configured to detect movement of the mobile device to a new location, which is a predetermined distance from the last identified or stored location or more than a predetermined distance. Depending on user settings, the mobile device 102 can be configured to prompt the mobile device user to associate the new location with the embedded virtual map and/or provide additional information on the new location. For example, the user settings may be established in such a way that the user shall be prompted to associate any new location with the map, by dropping a virtual "pin", when the mobile device 102 is moved equal to or more than 5 miles (e.g., 10, 20, 30, 40, 50, 100, 250, 500, 1000 miles, etc.).

The communication module 204 can be configured to communicate with a remote server. In one example, the communication module 204 is configured to communicate with the mapping system 104 to retrieve one or more promotional offers offered by merchants located in the nearby area within a predetermined distance from the identified current location. Such distance can also be predetermined in the user settings. The communication can be performed via a secure protocol using an application programming interface (API). To retrieve one or more available promotional offers, the communication module 204 may be configured to generate and send a user request, which may comprise information on the current location of the mobile device 102. Accordingly, the communication module 204 can be configured to receive one or more available promotional offers.

The communication module 204 can be further configured to transmit to the mapping system 104 information related to the current location of the mobile device 102 or any movement to a new location. Furthermore, the communication module 204 can be configured to retrieve (e.g., send a request and receive a response) a virtual map or certain parts of such map from the mapping system 104 or any other affiliated site 106 to display on a display screen of the mobile device 102 (not shown). The communication module 204 can be also configured to retrieve map elements (i.e., virtual map "pins" or "map navigation icons," for associating with the map and displaying to the user via the display screen of the mobile device 102.

According to various embodiments, the map element may comprise one or more of an icon to be associated with the location on the map and a content balloon associated with the icon to display descriptive information on promotional offers. The design and color of a map element may vary depending on application.

The communication module 204 can be further configured to enable the user to drop virtual pins to designate locations of interest visited by the user (e.g., a sports arena, a zoo, a state, and a country). The user can be motivated to drop pins by virtual incentive badges awarded for each virtual pin dropped. To drop a pin, the user can capture a location of interest using his mobile device. In one example, when the mobile device 102 cannot identify current location due to technical reasons, the user may be prompted to input the current location or confirm that the mobile device 102 has correctly identified the current location. In some other embodiments, the user may be prompted to input one or more locations of interest. Such locations of interest may, for example, relate to a location already visited by the user.

The communication module 204 can receive user inputs from any input means used by the mobile device 102 including, but not limited to, a keyboard and a touch sensitive display.

The mapping module 206 can be configured to associate the current location of the mobile device 102 and one or more locations of the merchants proposing promotional offers as retrieved by the communication module 204 with the virtual map. In some embodiments, the mapping module 206 can also prompt the user to associate any new location (when it is determined that the mobile device 102 has moved a certain distance from the last stored location) with the map, by dropping a new virtual "pin". In some other embodiments, the mapping module 206 can also prompt the user to confirm that any new location is to be associated with the map. User prompts and notifications can be provided during specific days of a week or periods of time during a day as the user may determine. For example, the user may select to receive notifications on weekends at breakfast time only.

The map element generator 208 can be configured to generate one or more map elements associated with the locations of the mobile device 102 and the merchants. In particular, the map element generator 208 can generate certain map elements depending on predetermined settings and on information received from the mapping system 104 or any other remote server. In one example, the map element generator 208 can generate a content balloon, which comprises information on promotional offers obtained from the mapping system 104.

The map element generator 208 can be utilized each time a new map element needs to be displayed on the virtual map. More specifically, an example embodiment may include the map element generator 208 that can be used to generate map elements when the user inputs a new location by dropping a virtual pin.

The displaying module 210 can be configured to display the map and the one or more map elements associated thereto. The displaying module 210 can also be configured to display, in a list view, the one or more locations of the merchants proposing promotional offers as retrieved by the communication module. Users are able to view additional details and limitations related to the listed promotional offers. The list view can be additionally configured to generate a link providing directions to the location of the merchant from the current location of the user. The promotional offers provided by the merchants may depend upon the registration of the merchants with the one or more subscription levels available on the remote server, and maintenance of the one or more merchants of the one or more subscription levels available on the remote server. The displaying module 210 may be implemented as a touch sensitive display, a monitor, a screen, and the like.

The incentive module 212 can be configured to generate one or more virtual incentive badges upon reaching predetermined locations associated with the map. In one example, a virtual incentive badge is generated when it is determined that the user has visited some or all states of the USA, countries/continents, stadiums, ballparks, ski resorts, national parks, restaurants, retail establishments, theme parks, zoos, and other landmarks.

The virtual incentive badge can be represented as a graphic element, text message, social networking post, and/or video/audio message. Usage of such virtual incentive badges may encourage users to utilize the functionality of the mobile application 112 installed in the mobile device 102.

The mobile database 214 can be configured to store one or more of the virtual map, the map elements, information related to promotional offers, number of offers redeemed, total monetary savings from redeemed promotional offers, and locations such as visited locations, locations of interest, and a current location.

Figure 3:
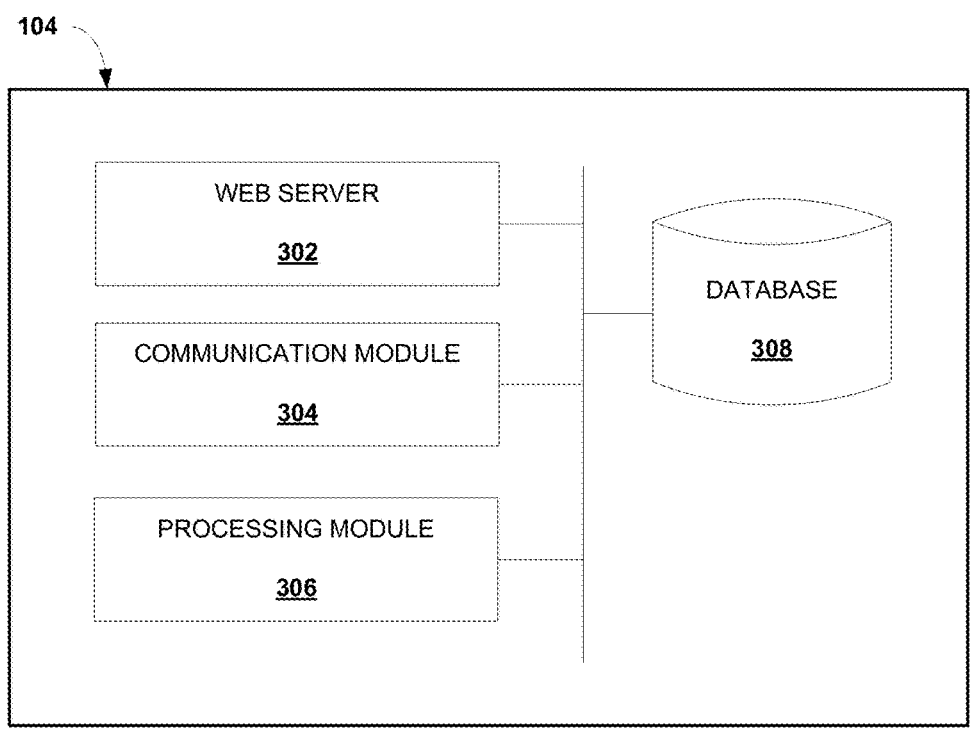
FIG. 3 is a diagram of a mapping system, according to an example embodiment.

FIG. 3 is a diagram of the mapping system 104, according to an example embodiment. In this embodiment, the mapping system 104 may comprise a web server 302, a communication module 304, a processing module 306, and a database 308. In other embodiments, the mapping system 104 may include additional, fewer, or different modules for various applications. Said modules can be implemented as hardware and/or software. Furthermore, all modules can be integrated within a single apparatus, or, alternatively, can be remotely located and optionally be accessed via a third party.

The web server 302 can be configured to host one or more sites directed to provide, among other things, functionality to establish and manage user membership profiles, manage user settings, and manage user statistics data. The one or more sites hosted by the web server 302 can also be configured to provide certain functionality for the merchants. In particular, the merchants may establish and manage profiles, establish and manage promotional offers, manage merchant statistics, and so forth.

According to various embodiments, the users may first register with the site hosted by the Web server 302 and create member profiles. If this is the case, the membership details may be stored in the database 308. The membership profile stored may comprise user information such as a name, a nickname, user credentials, a representative picture, an address, a phone number, a fax number, an e-mail address, a web address, or any other form of contact and personal information. As an alternative embodiment, a user would be able to register and login with the site hosted by the Web server utilizing one or more of a social networking profile of the user including, but not limited to, Facebook or Twitter.

Similarly, the merchants may also register with the site hosted by the web server 302 and create member profiles. The membership profile of the merchants can be stored in the database 308, and it may comprise merchant information, such as a business name, credentials, a representative picture/photo/logo, an address, a phone number, a fax number, an e-mail address, a web address, or any other form of contact and personal information. The merchant profile may also comprise commercial and related information, such as a description of services or products that can be provided to users, promotional offers, and any other digital content including, but not limited to, text, images, video, audio, and so forth.

The communication module 304 can be configured to connect the mapping system 104 to the one or more mobile devices 102 and/or the one or more affiliated sites 106 via the network 108. The connection and data transfer may be provided via one or more APIs.

In certain embodiments, the communication module 304 can be configured to receive and process requests obtained from the mobile devices 102 and transmit, upon request, elements including, but not limited to, virtual maps or their parts, map elements, information related to promotional offers.

The processing module 306 can be configured to process user requests to obtain relevant information including, but not limited to, promotional offers, store user locations, store locations of interest, maintain user and merchant profiles.

The database 308 may store membership related information, such as user profiles, merchant profiles, store promotional offers, and location-related information. The database 308 may also store user predetermined settings or merchant settings related to promotional offers.

Figure 4:
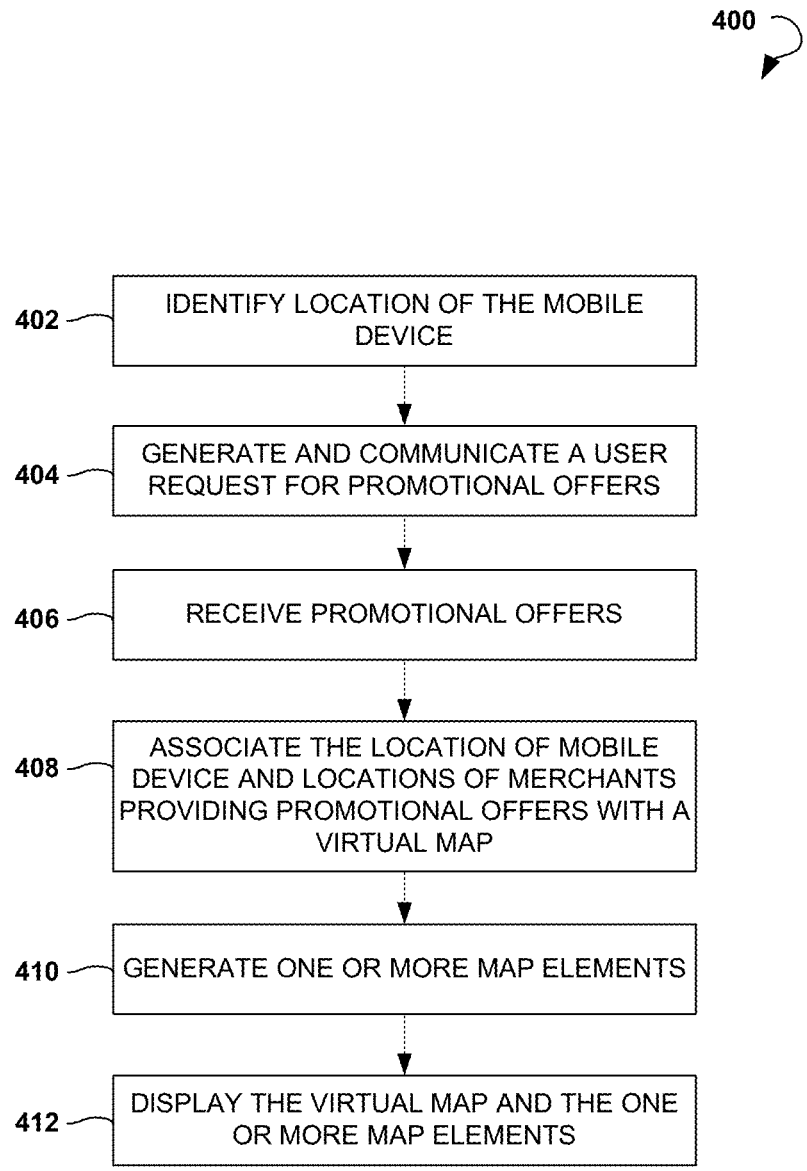
FIG. 4 is a process flow diagram showing a method for searching and displaying promotional offers on a display screen of a mobile device, according to an example embodiment.

FIG. 4 is a process flow diagram showing a method 400 for searching and displaying promotional offers on the display screen of the mobile device 102, according to an example embodiment.

The method 400 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the mobile device 102, and the method 400 can be performed by the various modules of the mobile device 102. Each of these modules can comprise processing logic. It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform some or all of various steps described herein, fewer or more modules may be provided and still fall within the scope of various embodiments.

As shown in FIG. 4, the method 400 may commence at operation 402 with the location identification module 202 identifying a current location of the mobile device 102. As mentioned, the location can be identified by receiving and processing GPS signals, base station information, IP addresses, or by processing user input.

At operation 404, the communication module 204 can generate and communicate to the remote server (i.e. the mapping system 104) a user request to obtain one or more promotional offers available in the nearby area within a predetermined distance from the mobile device 102. According to various embodiments, the user request may comprise the identified current location of the mobile device 102 or any other location specified by the user based on user settings, usage history, or user demographics such as age, gender, or family makeup.

At operation 406, the communication module 204 can receive one or more promotional offers provided by the merchants located in the nearby area within a predetermined distance from the identified location based on one or more of user settings, usage history, and user demographics such as age, gender, or family makeup. The promotional offers may comprise information on merchants, their locations, and details of the promotional offers. The distance of the "nearby area" can be indicated by the user in the settings at the mobile device 102 or the user profile at the site hosted by the web server 302.

At operation 408, the mapping module 206 can associate the location of the mobile device 102 and locations of the one or more merchants providing the one or more promotional offers with the virtual map based on one or more of user settings, usage history, and user demographics such as age, gender, or family makeup.

At operation 410, the map element generator 208 can generate one or more map elements. The one or more map elements can be associated with the current location of the mobile device 102 and the locations of the one or more merchants offering one or more promotional offers.

According to some embodiments, the generation of map elements can depend on predetermined user/merchant settings and information received from the mapping system 104 or any other remote server. In one example, the map element generator 208 can generate the map elements for the promotional offers such that they comprise an icon and a content balloon, which comprise information on promotional offers previously obtained from the mapping system 104.

At operation 412, the displaying module 210 can display the virtual map and the one or more map elements integrated thereto. The displaying module 210 can also be configured to display, in a list view, the one or more promotional offers proposed by merchants as retrieved by the communication module 204. Users are able to view additional details and limitations related to the listed promotional offers. The list view can be additionally configured to generate a link providing directions to the location of the merchant from the current location of the user. The displaying can be performed on the screen display of the mobile device 102.

Figure 5:
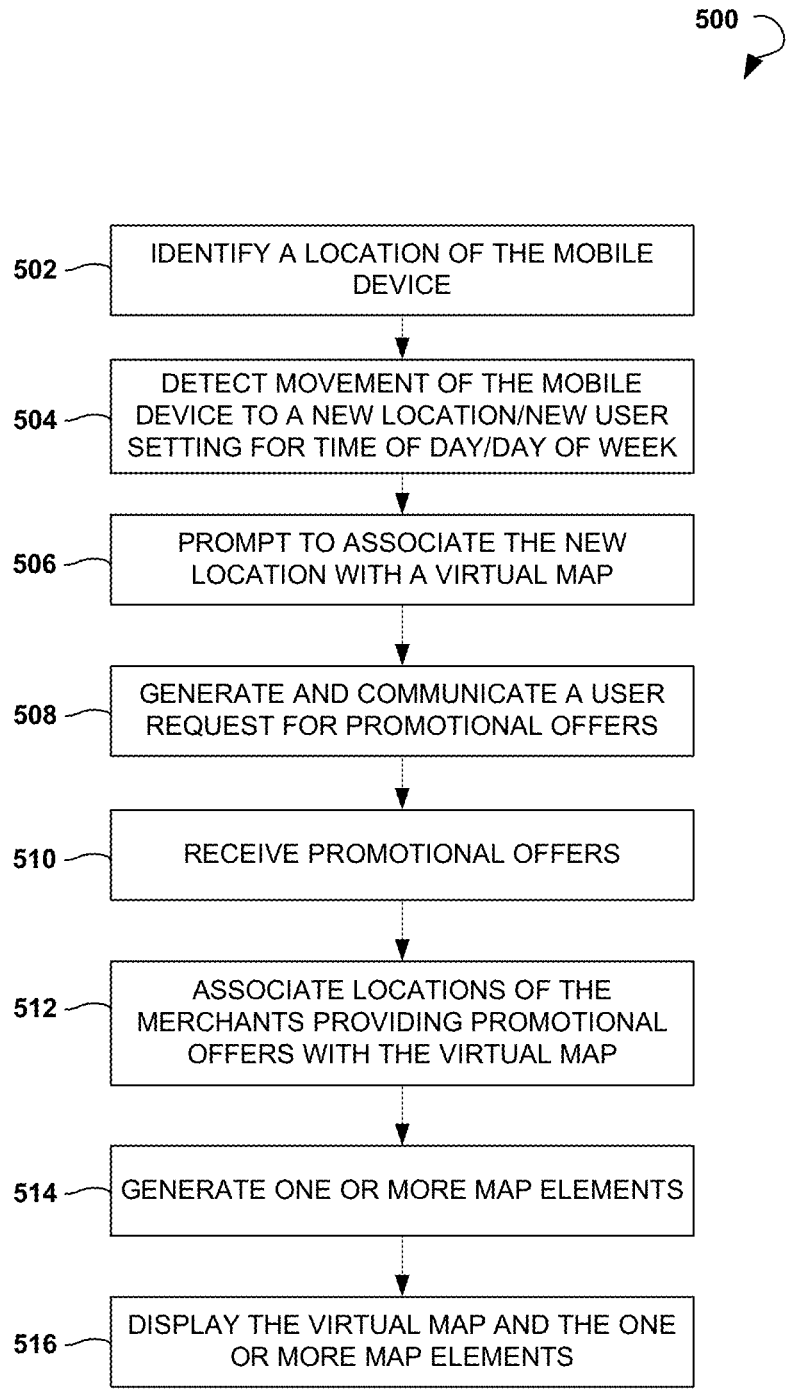
FIG. 5 is a process flow diagram showing a method for searching and displaying promotional offers on a display screen of a mobile device, according to another example embodiment.

FIG. 5 is a process flow diagram showing a method 500 for searching for and displaying promotional offers on the display screen of the mobile device 102, according to another example embodiment.

The method 500 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the mobile device 102, and the method 500 can be performed by the various modules of the mobile device 102. Each of these modules can comprise processing logic. It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform some or all of various steps described herein, fewer or more modules may be provided and still fall within the scope of various embodiments. The method 500 can be performed by the various modules discussed above with reference to FIG. 2.

The method 500 may commence at operation 502 with the location identification module 202 identifying a current location of the mobile device.

At operation 504, the location identification module 202 can detect movement of the mobile device 102 to a new location, which is a predetermined distance from the last identified or stored location.

Next, at operation 506, the mapping module 206 can prompt the user of the mobile device 102 to associate the new location with the virtual map, by dropping a virtual "pin". The prompting may depend on predetermined user settings. For example, the user settings may be established in such a way that the user shall be prompted to associate with the map any new location, when the mobile device 102 is moved equal to or more than 5 miles (e.g., 10, 20, 30, 40, 50, 100, 250, 500, 1000 miles, etc.). Additionally, the predetermined user settings can regulate when the notifications are sent. Specifically, the user settings can determine the days and time to provide notifications.

At operation 508, the communication module 204 can generate and communicate to the remote server (i.e. the mapping system 104) a user request to obtain one or more promotional offers available in the nearby area within a predetermined distance from the mobile device 102.

At operation 510, the communication module 204 can receive one or more promotional offers provided by merchants located in the nearby area within a predetermined distance from the identified location based on one or more of user settings, usage history, and user demographics.

At operation 512, the mapping module 206 can associate the locations of the one or more merchants providing the one or more promotional offers with the virtual map.

At operation 514, the map element generator 208 can generate one or more map elements related to the location of the mobile device 102 and the merchants.

At operation 516, the displaying module 210 can display the virtual map and the one or more map elements integrated thereto. Alternatively, the displaying module 210 can display, in a list view, the one or more promotional offers proposed by merchants. The displaying can be performed on the screen display of the mobile device 102.

Figure 6:
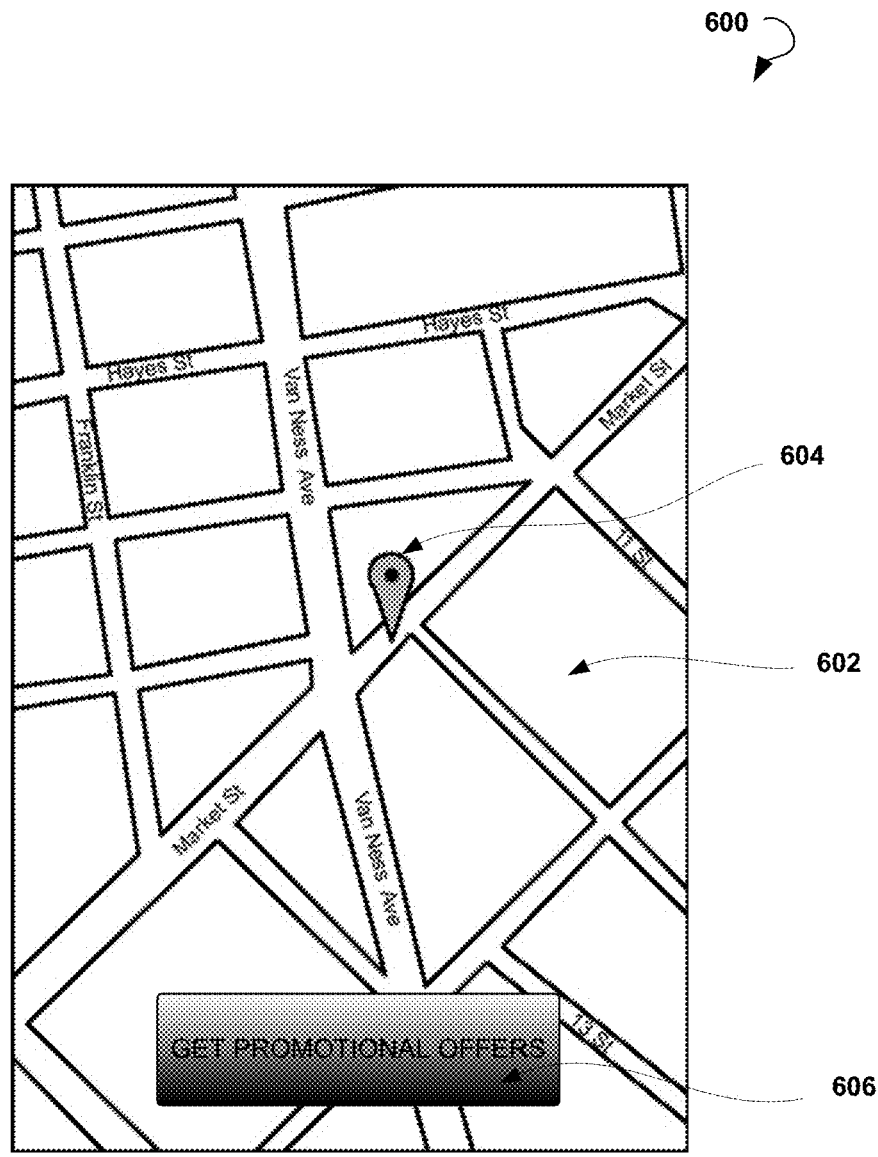
FIG. 6 illustrates a graphical user interface of a mobile device, according to an example embodiment.

FIG. 6 illustrates a graphical user interface 600 of the mobile device 102, according to an example embodiment. The graphical user interface 600 shows the virtual map 602 and a map element 604. The map element 604 defines the current location of the mobile device 102 on the displayed virtual map.

The graphical user interface 600 may also comprise an actionable button 606 to initiate the process of searching and displaying promotional offers on the display screen of the mobile device 102 in line with the method described above with reference to FIG. 2.

Figure 7:
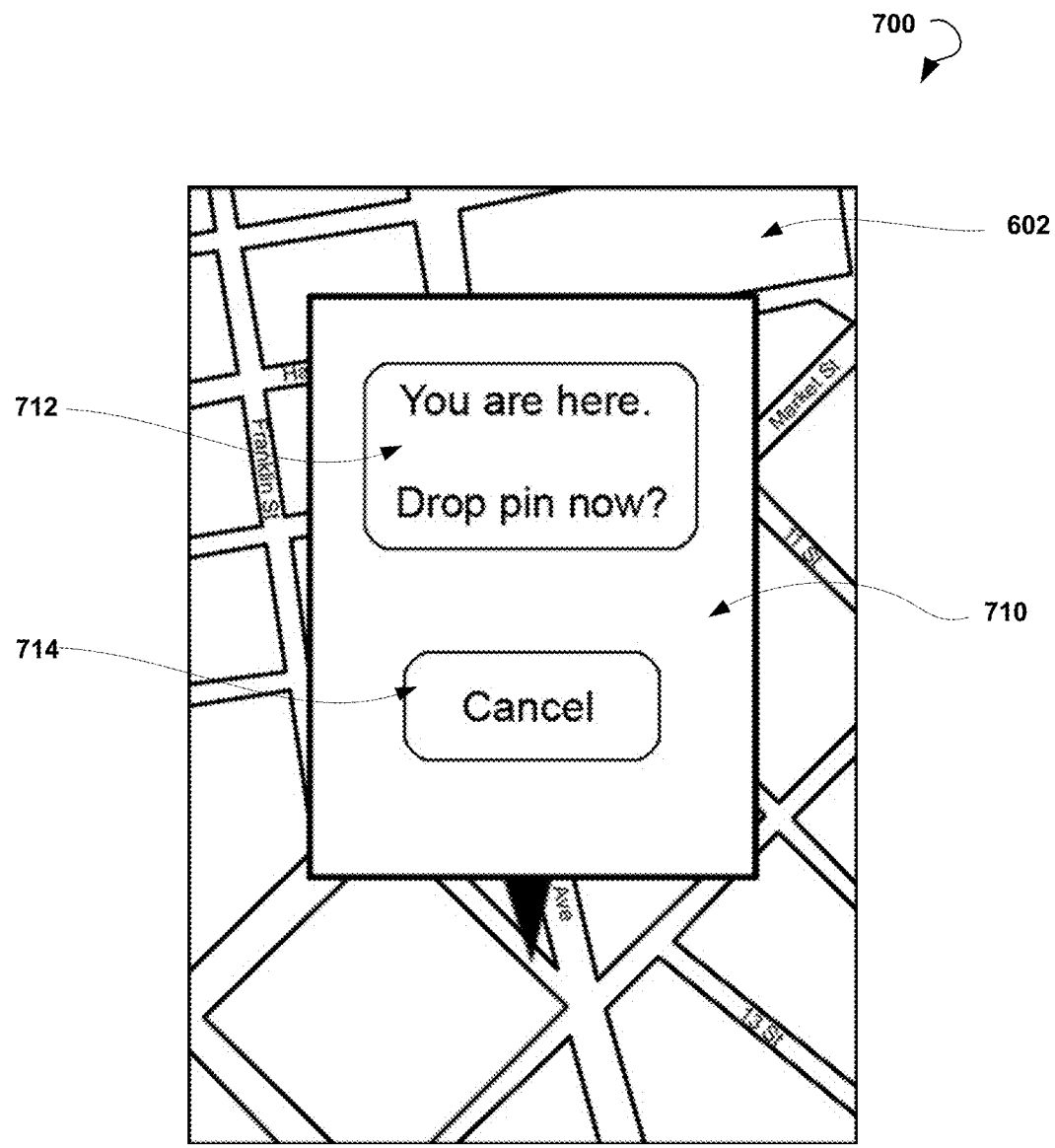
FIG. 7 illustrates a graphical user interface of a mobile device, according to an example embodiment.

FIG. 7 illustrates a graphical user interface 700 of the mobile device 102, according to an example embodiment. The graphical user interface 700 shows the virtual map 602 and a prompting section 710. The prompting section 710 can be displayed at the display screen of the mobile device 102 when the mobile device 102 has moved to a new location of a distance more than a predetermined distance, or at predefined days of the week and times of day specified by the user in user settings. According to the example shown, the prompting section 710 may propose the user to associate a new location of the user with the virtual map by dropping a virtual "pin" element.

The prompting section 710 may comprise an actionable button 712 to associate the new location in order to initiate the process as described with reference to FIG. 5. The prompting section 710 may also comprise an actionable button 714 to cancel the process, which can be used when the user does not want to proceed with this process.

Figure 8:
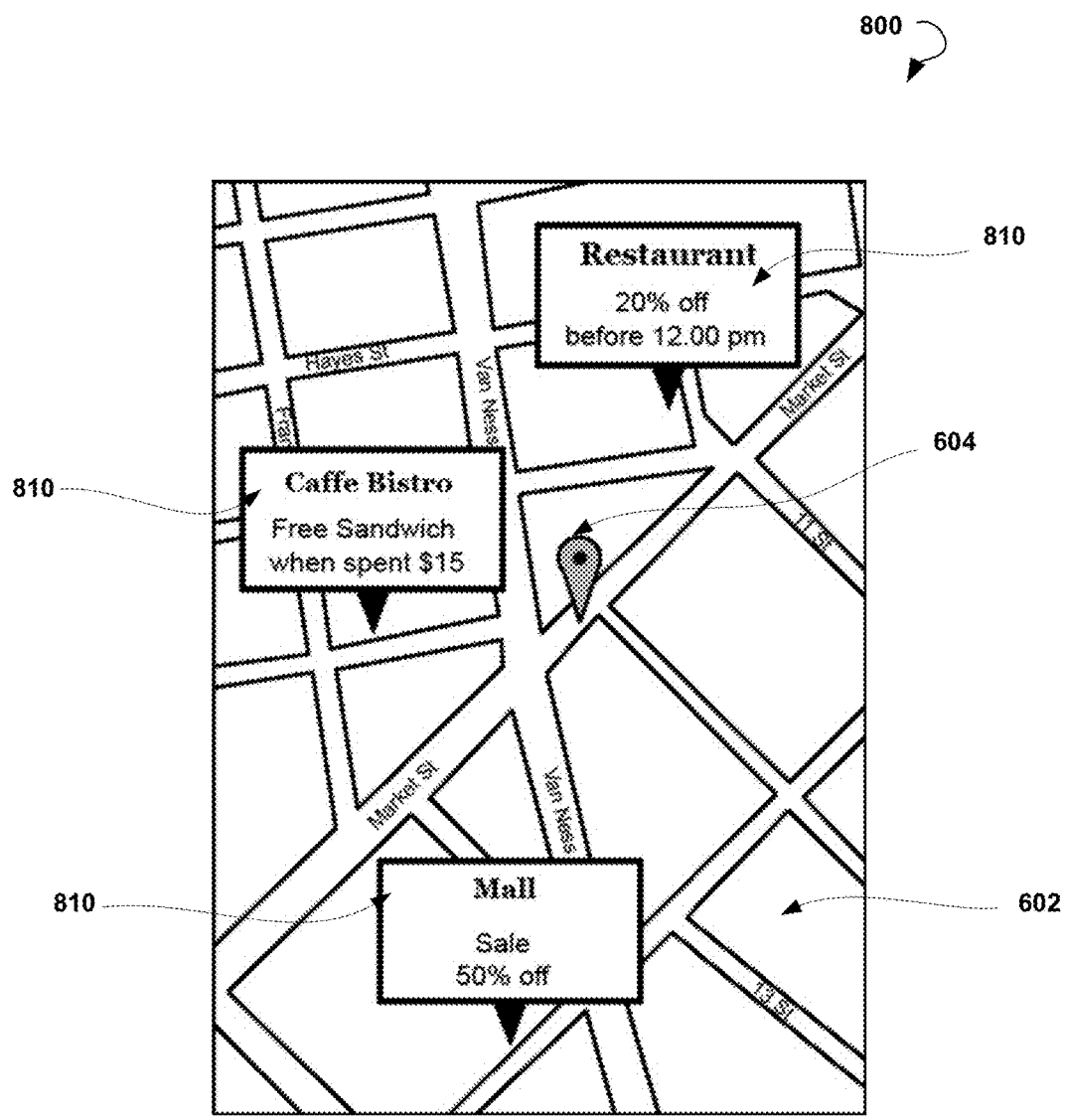
FIG. 8 illustrates a graphical user interface of a mobile device, according to an example embodiment.

FIG. 8 illustrates a graphical user interface 800 of the mobile device 102, according to an example embodiment. The graphical user interface 800 shows the virtual map 602 and the map element 604 defining the current location of the mobile device 102. The graphical user interface 800 also comprises several map elements 810 illustrating promotional offers available in the nearby area, and identifying the locations of the merchants proposing such promotional offers. The generation and displaying of these map elements can be performed by the method disclosed with reference to FIG. 4 and FIG. 5. More specifically, and as shown in FIG. 8, the map elements 810 are icons having content balloons. The content balloons comprise indications of the merchants (i.e., their names or logos) and brief descriptions of the promotional offers. The graphical user interface 800 may also comprise an actionable button 812 that prompts the user to switch from the virtual map 602 view to a list view 900 (shown in FIG. 9) comprising a vertical listing of the one or more promotional offers proposed by the merchants. Additionally, according to some embodiments, content within the list view 900 can comprise expiration countdown timer of the one or more promotional offers.

According to some embodiments, the map elements 810 can be selectable such that when the user selects one of them, the mobile device 102 provides detailed information on the merchant and the promotional offer. Furthermore, or alternatively, the mobile device 102 may provide one or more communication options to the user such that the user may communicate with the merchant or the like.

Figure 9:
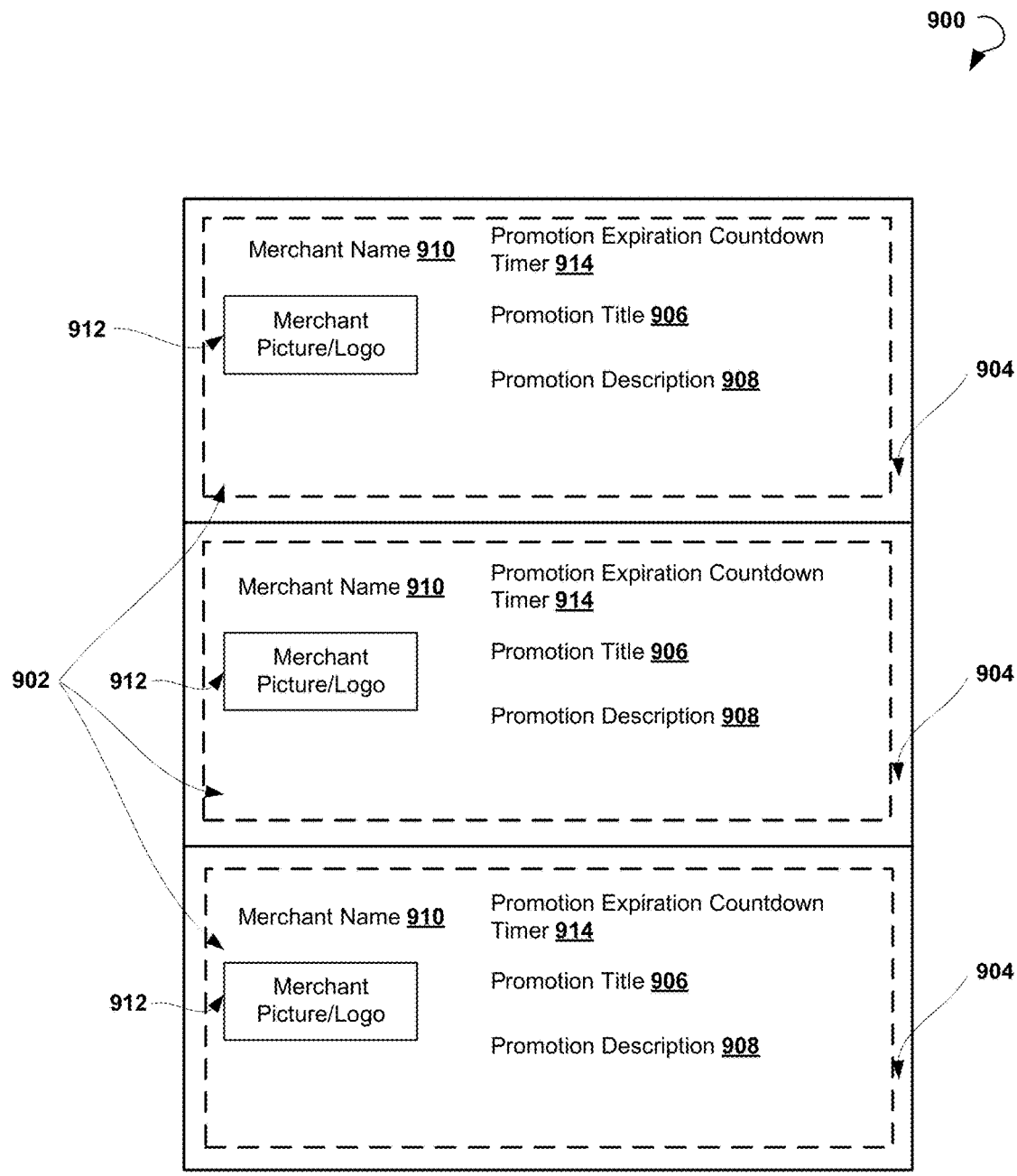
FIG. 9 illustrates a graphical user interface of a mobile device, according to an example embodiment.

FIG. 9 illustrates a graphical user interface 900 of the mobile device 102, according to an example embodiment. The graphical user interface 900 shows a view of vertical listings 902 of the promotional offers 904 provided by the merchants. The promotional offer 904 displayed in the list view 902 can comprise one or more of: promotion title 906, promotion description 908, merchant name 910, merchant picture or logo 912, and promotion expiration countdown timer 914.

According to some embodiments, the promotional offers 904 can be selectable such that when the user selects one of them, the mobile device 102 provides detailed information on the merchant and the promotional offer including, but not limited to, directions to the merchant location. Furthermore, or alternatively, the mobile device 102 may provide one or more communication options to the user such that the user may communicate, for example, with the merchant.

Figure 10:
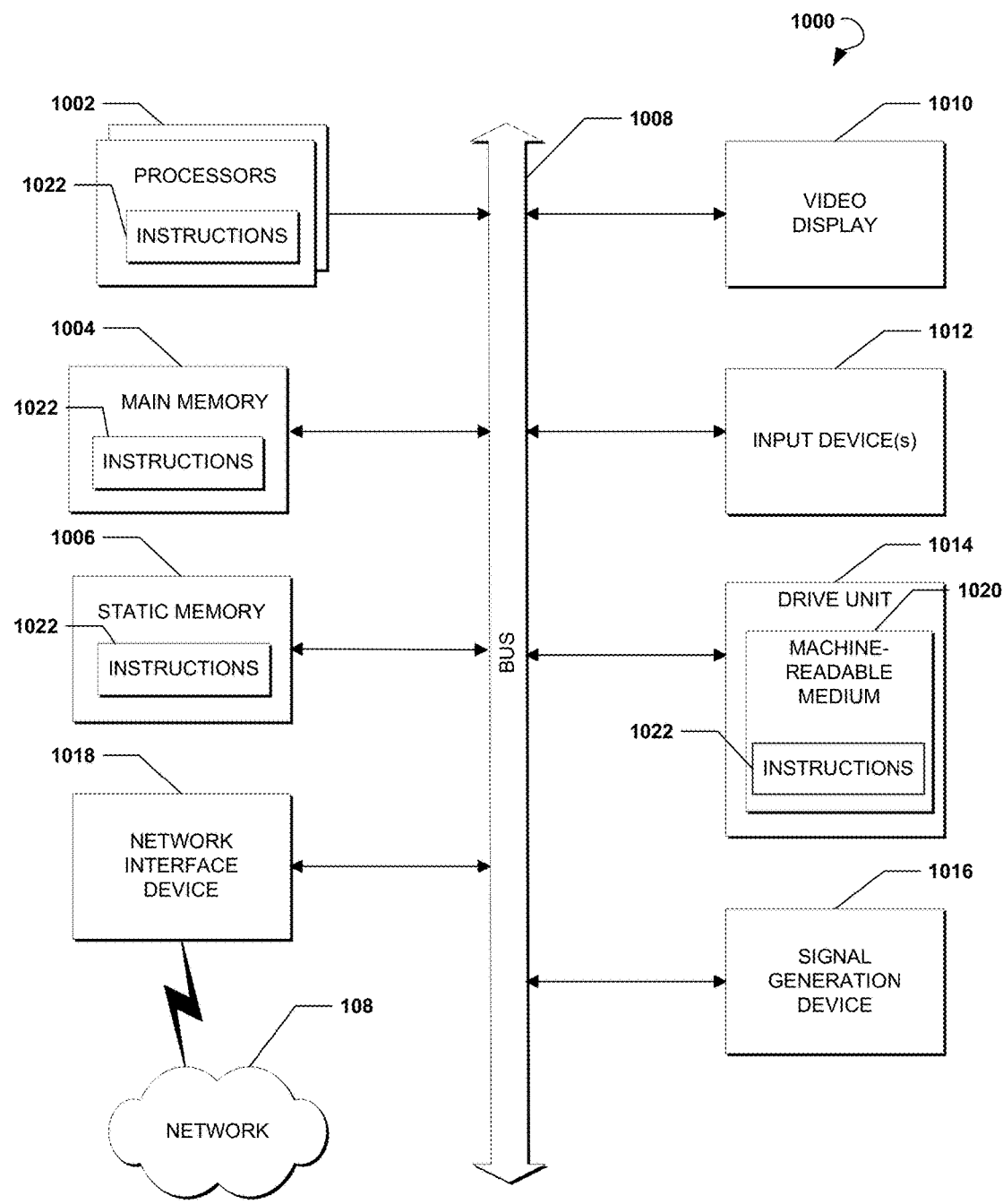
FIG. 10 is a diagrammatic representation of an example machine in the form of a computer system within which a set of instructions, for the machine to perform any one or more of the methodologies discussed herein, is executed.

FIG. 10 shows a diagrammatic representation of a computing device for a machine in the example electronic form of a computer system 1000, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002 (e.g., a central processing unit (CPU), a graphics processing unit (GPU), or both), and a main memory 1004 and a static memory 1006, which communicate with each other via a bus 1008. The computer system 1000 can further include a video display unit 1010 (e.g., a liquid crystal display (LCD) or a cathode ray tube (CRT)). The computer system 1000 also includes at least one input device 1012, such as an alphanumeric input device (e.g., a keyboard), a cursor control device (e.g., a mouse), a microphone, and so forth. The computer system 1000 also includes a disk drive unit 1014, a signal generation device 1016 (e.g., a speaker), and a network interface device 1018.

The disk drive unit 1014 includes a computer-readable medium 1020 that stores one or more sets of instructions and data structures (e.g., instructions 1022) embodying or utilized by any one or more of the methodologies or functions described herein. The instructions 1022 can also reside, completely or at least partially, within the main memory 1004 and/or within the engines 1002 during execution thereof by the computer system 1000. The main memory 1004 and the engines 1002 also constitute machine-readable media.

The instructions 1022 can further be transmitted or received over the network 108 via the network interface device 1018 utilizing any one of a number of well-known transfer protocols (e.g., Hyper Text Transfer Protocol (HTTP), CAN, Serial, and Modbus).

While the computer-readable medium 1020 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for searching for and displaying promotional offers on the display screen of a mobile device have been disclosed. These methods and systems facilitate the delivering and usage of promotional offers, increase attraction of potential customers, and make it easy for the merchants to promote their products or services.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for searching for and displaying promotional offers on a display screen of a mobile device, the method comprising:
    identifying, by a processor of the mobile device, a location of the mobile device;
    communicating, by the processor, to a remote server, a user request to obtain one or more available promotional offers, wherein the user request comprises the location of the mobile device;
    based on the user request and the location, selecting, by the remote server, the one or more promotional offers provided by one or more merchants located in a nearby area in a predetermined vicinity of the location of the mobile device, the one or more promotional offers to be provided by the remote server to the processor in response to the user request, the one or more promotional offers being selected by the remote server from a plurality of promotional offers stored on the remote server;
    receiving, by the processor, from the remote server, the one or more promotional offers provided by the one or more merchants located in the nearby area in the predetermined vicinity of the location of the mobile device, each of the one or more promotional offers being associated with offer information provided by the one or more merchants to the remote server for each of the one or more promotional offers, the offer information including at least an offer expiration time selected by the one or more merchants for each of the one or more promotional offers;
    receiving, by the processor, a user input from a user of the mobile device, the user input including at least a selection of settings, the settings including at least days of a week and a period of time of a day in which periodical displaying of the one or more promotional offers on the mobile device is enabled by the user; and
    displaying, by a displaying module of the mobile device, based on a current day of the week and a current period of time of the day, a virtual map or a list view of the one or more promotional offers, and one or more map elements on the virtual map or the list view, wherein the one or more map elements denote, on the virtual map or the list view:
        the location of the mobile device,
        locations associated with the one or more promotional offers, and
        links associated with each the one or more promotional offers, wherein selection, by the user, of one of the links associated with at least one of the locations associated with the one or more promotional offers in the predetermined vicinity of the location of the mobile device initiates displaying, by the displaying module, a route for the user to get from the location of the mobile device to the at least one of the locations associated with the one or more promotional offers in the predetermined vicinity of the location of the mobile device,
    wherein the one or more map elements are displayed on the virtual map or the list view when the current day of the week is one of the days of the week day set by the user in the settings and when the current period of time of the day is the period of time of the day set by the user in the settings.

2. The computer-implemented method of claim 1, wherein the one or more map elements comprise one or more of an icon associated with the location on the virtual map and a content balloon associated with the icon to display descriptive information.

3. The computer-implemented method of claim 1, further comprising:
    detecting, by the processor, movement of the mobile device to a new location, which is within a predetermined distance from a last identified location or a stored location; and
    prompting, by the processor, the user of the mobile device to associate the new location with the virtual map by dropping a virtual "pin".

4. The computer-implemented method of claim 3, further comprising:
    communicating, by the processor, information on the new location of the mobile device to the remote server.

5. The computer-implemented method of claim 1, further comprising:
    enabling, by the processor, the user of the mobile device to drop a virtual pin, wherein the virtual pin designates a location of interest, the dropping of the virtual pin by the user being rewarded with credit towards at least one virtual incentive badge; and associating, by the processor, the location of interest with the virtual map, wherein the location of interest comprises a location visited by the user.

6. The computer-implemented method of claim 5, further comprising:

generating, by the processor, one or more map elements corresponding to one or more locations of interest; and displaying, by the displaying module, the map, and the one or more map elements, or the list view of the one or more locations of interest.

7. The computer-implemented method of claim 1, further comprising:

enabling, by the processor, the user of the mobile device to configure the settings, the settings further comprising one or more of:

a distance between a current location and a last identified location or a stored location of the mobile device to make a notification for the user;

a size of the nearby area to provide the user with the one or more promotional offers of the one or more merchants located in the nearby area;

one or more days of a week and one or more times of a day to notify the user;

demographics including at least one of the following: age, gender, and family makeup; and types of the one or more promotional offers to display including at least one of the following: food, retail, health and beauty, entertainment, and services.

8. The computer-implemented method of claim 1, further comprising:

retrieving, by the processor, from the remote server, the virtual map and the one or more map elements.

9. The computer-implemented method of claim 1, wherein the one or more promotional offer comprise one or more of: offer information, a merchant picture, a merchant logo, a merchant name, a merchant address, merchant contact information, a distance between the user and the one or more merchants, rating, customer reviews, and a price range, wherein the offer information comprises one or more of: a free product, a free service, a financial discount, reward points, an offer expiration countdown timer, and a rebate amount.

10. The computer-implemented method of claim 1, wherein the one or more promotional offers is provided by the one or more merchants upon registration of the one or more merchants with one or more subscription levels available on the remote server, and maintenance of the one or more merchants of the one or more subscription levels available on the remote server.

11. The computer-implemented method of claim 1, further comprising:

generating, by the processor, one or more virtual incentive badges over predetermined locations associated with the virtual map.

12. A system for searching and displaying promotional offers on a display screen of a mobile device, the system comprising:

a location identification module associated with the mobile device, the location identification module being configured to identify a location of the mobile device;

a communication module associated with the mobile device, the communication module being configured to:

communicate, to a remote server, a user request to obtain one or more available promotional offers, wherein the user request comprises the location of the mobile device;

receive, from the remote server, the one or more promotional offers provided by one or more merchants located in a nearby area in a predetermined vicinity of the location of the mobile device, each of the one or more promotional offers being associated with offer information provided by the one or more merchants to the remote server for each of the one or more promotional offers, the offer information including at least an offer expiration time selected by the one or more merchants for each of the one or more promotional offers;

receive a user input from a user of the mobile device, the user input including at least a selection of settings, the settings including at least days of a week and a period of time of a day in which periodical displaying of the one or more promotional offers on the mobile device is enabled by the user; and a displaying module configured to display, based on a current day of the week and a current period of time of the day, a virtual map or a list view of the one or more promotional offers, and one or more map elements on the virtual map or the list view, wherein the one or more map elements denote, on the virtual map or the list view:

the location of the mobile device, locations associated with the one or more promotional offers, and links associated with each the one or more promotional offers, wherein selection, by the user, of one of the links associated with at least one of the locations associated with the one or more promotional offers in the predetermined vicinity of the location of the mobile device initiates displaying, by the displaying module, a route for the user to get from the location of the mobile device to the at least one of the locations associated with the one or more promotional offers in the predetermined vicinity of the location of the mobile device, wherein the one or more map elements are displayed on the virtual map or the list view when the current day of the week is one of the days of the week day set by the user in the settings and when the current period of time of the day is the period of time of the day set by the user in the settings; and the remote server in communication with the communication module associated with the mobile device, the remote server being configured to:

based on the user request and the location, select the one or more promotional offers provided by the one or more merchants located in the nearby area in the predetermined vicinity of the location of the mobile device, the one or more promotional offers to be provided by the remote server to the processor in response to the user request, the one or more promotional offers being selected by the remote server from a plurality of promotional offers stored on the remote server.

13. The system of claim 12, wherein the location identification module is further configured to detect movement of the mobile device to a new location, which is within a predetermined distance from a last identified location or a stored location; and wherein the system further comprises a mapping module configured to prompt the user of the mobile device to associate the new location with the virtual map by dropping a virtual pin.

14. The system of claim 13, wherein
the communication module is further configured to communicate information on the new location of the mobile device to the remote server.

15. The system of claim 12, wherein
the communication module is further configured to enable the user of the mobile device to drop a virtual pin, wherein the virtual pin designates a location of interest, the dropping of the virtual pin by the user being rewarded with credit towards at least one virtual incentive badge; and
wherein the system further comprises a mapping module configured to associate the location of interest with the virtual map,
wherein the location of interest comprise a location visited by the user.

16. The system of claim 15, wherein
the mapping module is further configured to provide prompts on one or more days of a week and one or more periods of time during a day.

17. The system of claim 12, wherein
the communication module is further configured to retrieve, from the remote server, one or more of: the virtual map the one or more map elements.

18. The system of claim 12, further comprising:
an incentive module configured to generate one or more virtual incentive badges over predetermined locations associated with the virtual map.

19. A non-transitory machine-readable medium having instructions stored thereon, which when executed by one or more computers, cause the one or more computers to:
identify, by a processor of a mobile device, a location of the mobile device;
communicate, by the processor, to a remote server, a user request to obtain one or more available promotional offers, wherein the user request comprises the location of the mobile device;
based on the user request and the location, select, by the remote server, the one or more promotional offers provided by one or more merchants located in a nearby area in a predetermined vicinity of the location of the mobile device, the one or more promotional offers to be provided by the remote server to the processor in response to the user request, the one or more promotional offers being selected by the remote server from a plurality of promotional offers stored on the remote server;
receive, by the processor, from the remote server, the one or more promotional offers provided by the one or more merchants located in the nearby area in the predetermined vicinity of the location of the mobile device, each of the one or more promotional offers being associated with offer information provided by the one or more merchants to the remote server for each of the one or more promotional offers, the offer information including at least an offer expiration time selected by the one or more merchants for each of the one or more promotional offers;
receive, by the processor, a user input from a user of the mobile device, the user input including at least a selection of settings, the settings including at least days of a week and a period of time of a day in which periodical displaying of the one or more promotional offers on the mobile device is enabled by the user; and
display, by a displaying module of the mobile device, based on a current day of the week and a current period of time of the day, a virtual map or a list view of the one or more promotional offers, and one or more map elements on the virtual map or the list view, wherein the one or more map elements denote, on the virtual map or the list view;
the location of the mobile device,
locations associated with the one or more promotional offers, and
links associated with each the one or more promotional offers, wherein selection, by the user, of one of the links associated with at least one of the locations associated with the one or more promotional offers in the predetermined vicinity of the location of the mobile device initiates displaying, by the displaying module, a route for the user to get from the location of the mobile device to the at least one of the locations associated with the one or more promotional offers in the predetermined vicinity of the location of the mobile device,
wherein the one or more map elements are displayed on the virtual map or the list view when the current day of the week is one of the days of the week day set by the user in the settings and when the current period of time of the day is the period of time of the day set by the user in the settings.

* * * * *